United States Patent [19]

Steck

[11] Patent Number: 4,956,151

[45] Date of Patent: Sep. 11, 1990

[54] DEVICE FOR HOLDING TOGETHER AND RELEASING CONICAL JOINTS

[75] Inventor: Arnold Steck, Wattwil, Switzerland

[73] Assignee: Buchi Laboratoriums-Technik AG, Flawil, Switzerland

[21] Appl. No.: 252,590

[22] Filed: Oct. 3, 1988

[30] Foreign Application Priority Data

Oct. 22, 1987 [DE] Fed. Rep. of Germany ... 8714124[U]

[51] Int. Cl.[5] ........................ B01L 11/00; F16L 49/00

[52] U.S. Cl. ...................................... 422/103; 422/99; 422/104; 285/309; 285/320; 285/332.1; 285/387; 285/911

[58] Field of Search ....................... 422/99, 103; 285/8, 285/387, 332, 332.1, 320, 911, 309; 403/299, 307; 215/286, 100 R

[56] References Cited

U.S. PATENT DOCUMENTS 2,453,669 11/1948 Meneses ............................. 285/911
2,494,774 1/1950 Messick .................................. 285/8
3,129,476 4/1964 Sindlinger ........................... 285/332
3,544,281 12/1970 Phillips ............................... 285/911
4,582,444 4/1986 Miskins .............................. 285/387

FOREIGN PATENT DOCUMENTS 2589221 4/1987 France .

*Primary Examiner*—Christine M. Nucker
*Assistant Examiner*—William H. Beisner
*Attorney, Agent, or Firm*—William R. Hinds

[57] ABSTRACT

The nut (3) is rotatable on the external thread (4) on the conical pin (1). A shackle (6) is mounted on the said nut and is pivotable about an axis (7) transverse to and at a distance from the central axis. The shackle engages behind the swelling (5) on the conical sleeve (2) and can be tightened by turning the nut (3). The nut (3) is formed so as to be divisible and is held together by a clamping device (8).

7 Claims, 2 Drawing Sheets

FIG. 1
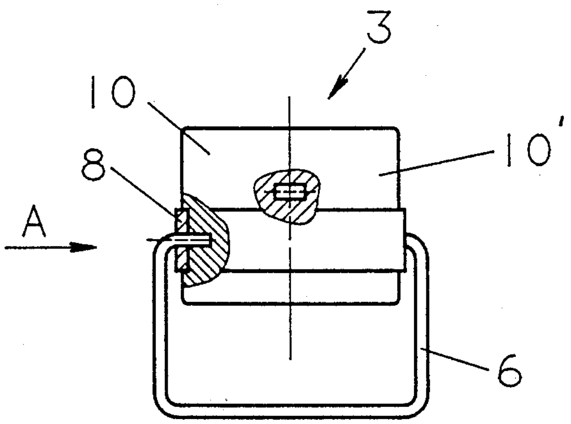
FIG. 2
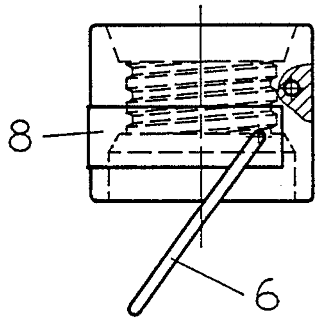
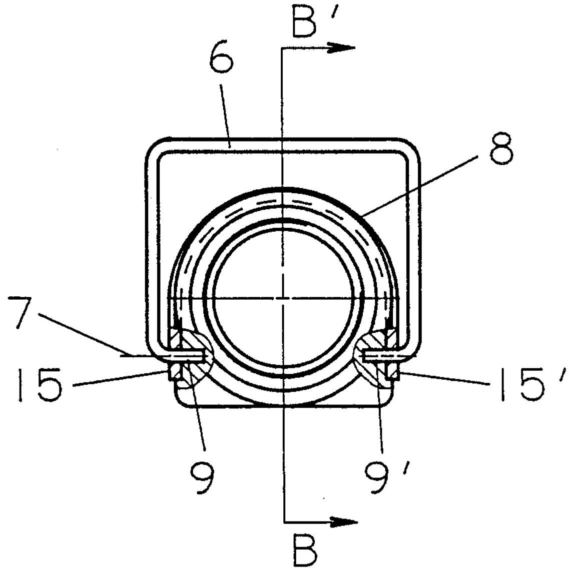
FIG. 3
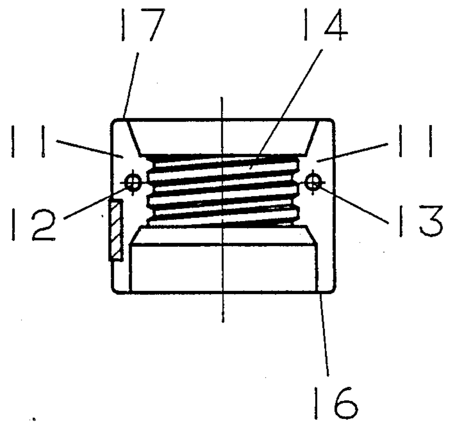
FIG. 4

DEVICE FOR HOLDING TOGETHER AND RELEASING CONICAL JOINTS

BACKGROUND OF THE INVENTION

The invention relates to a device for holding together and releasing conical joints, in particular on laboratory apparatus, consisting of a conical pin and a conical sleeve according to the preamble of claim 1. Devices of this kind act on the one hand as fixing elements, for example for connecting a glass plunger with a conical ground joint in a positively locking manner to laboratory apparatus having a complementary conical ground joint.

Since conical ground joints are often difficult to separate again due to changes in temperature, deposits etc, the nut generally also serves to ease the release of the joint by being rotated in the opposite direction in order to push out one of the two connected parts. A generically comparable device is already known, in which the nut is screwed on to an outer thread, the thread abutting directly against the conical pin and having a core diameter of the same size or greater than the greatest external diameter of the cone. The clamping device consists of segment-like aprons extending downwards over a circumferential area of 180° on the nut, an inwardly oriented projection being disposed on the ends of the said aprons for engaging behind the swelling on the conical sleeve. The conical sleeve with the swelling is inserted laterally into the clamping device of the nut and then pushed, together with the nut, over the conical pin and screwed on.

A slightly different solution is proposed in FR-A-2 589 221, wherein the outer thread is disposed on the conical sleeve and not on the conical pin. The nut is in this case formed as a union nut and, when connected, bears against a collar on the conical pin.

A disadvantage of the known devices is that the conical sleeve or the glass plunger abutting it can only be removed when the nut is completely unscrewed from the outer thread. This is especially time-consuming in cases where the conical ground joint is released automatically and where it is not necessary to press by means of the nut. Furthermore, during handling, the nut may drop out and be lost. A further disadvantage of known devices is that the greatest outer diameter of the cone must be smaller than the outer thread, in order that the nut can be screwed on. In certain cases, however, it would be desirable to be able to use relatively large cone diameters without the necessity for the thread on the conical pin to be correspondingly larger.

SUMMARY OF THE INVENTION

It is therefore an object of the invention to create a device of the kind cited at the beginning, wherein the joint can be secured in a simple manner without the nut having to be completely screwed on. The device is also intended for use in cases where a cone or other component, whose outer diameter is greater than the thread outer diameter, is disposed on both sides of the outer thread. This object is achieved according to the invention by a device having the features of claim 1.

To release the shackle, as can be seen, the nut only needs to be unscrewed by less than one turn. The shackle can then be pivoted up and the attached vessel can be removed from the conical pin. The eccentric hinging of the shackle ensures a secure fit of the shackle behind the continous swelling of the vessel opening.

If the nut is formed so as to be divisible in a plane approximately parallel to the central axis and if the said nut is surrounded on its outside by a detachable clamping device, the nut can be secured by snapping or ramming on to the thread. Thus at both ends of the outer thread, outer diameters are provided which are larger than the thread outer diameter. The clamping device holds the nut together in the correct position, so that the nut is disposed on the thread in an unlosable manner.

The shackle is preferably hinged to the clamping device and has free ends which engage in the nut via the clamping device, the shackle being flexibly formed, in such a manner that the two ends may be stretched apart for engaging. The shackle thus secures the clamping device in the simplest manner, in that the two free ends of the shackle fix the clamping device in position. The spring tension of the shackle holds the whole arrangement together, so that it is only possible to detach the nut by previously removing the shackle. The clamping device furthermore preferably has the configuration of a U-shaped collar, which can be pushed laterally over the nut.

If the nut is divided into two halves and if at least one locating element is disposed on the cut faces, the locating element engaging with positive locking in a recess in the adjacent cut face of the other half, the nut can be composed particularly simply. The two halves can in this case be manufactured by injection moulding from a relatively hard and temperature resistant plastic. The locating elements, e.g. in the form of small bolts, ensure precise locking together of the two halves. Obviously, however, the nut could also be formed in one piece, in which case it has a hinge-like joint between two pivotably opening halves for opening. A solution of this kind is possible in the case of small thread outer diameters, for example, wherein the two half shells of the nut only have to be stretched by a minimal amount. Whilst the nut can be made of a suitable plastics material, the shackle and the clamping device are preferably made of metal in order to ensure the necessary mechanical stability.

BRIEF DESCRIPTION OF THE DRAWINGS

An embodiment of the invention is described in more detail below and illustrated in the drawings, in which:

FIG. 1 is a side view of a nut,

FIG. 2 a view from the direction of the arrow A of the nut according to FIG. 1,

FIG. 3 a plan view of the nut according to FIG. 1,

FIG. 4 a section through the plane B' B of the nut according to FIG. 3,

DETAILED DESCRIPTION OF THE DRAWINGS

Figure 5:
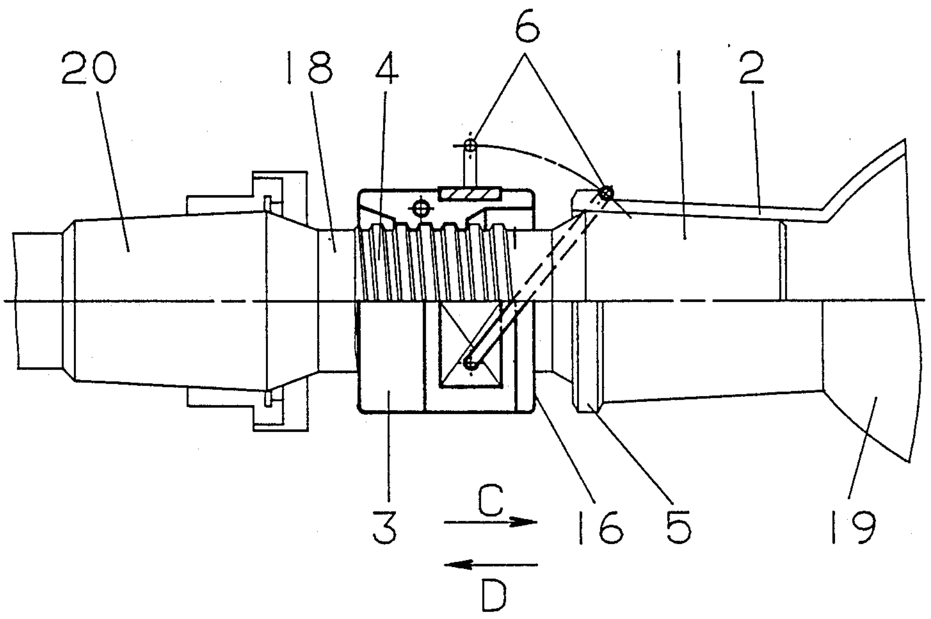
FIG. 5 a nut on a steam duct of a rotary evaporator.

As is seen from FIGS. 1 to 4, the device essentially consists of a nut 3 having an inner thread 14, preferably a trapezoidal thread. The nut consists of the two halves 10 and 10'. On the cut faces 11 of each half, a bolt 12 is disposed, which engages in a recess 13 on the adjacent half. In the example, one bolt and one recess are shown on each half. Obviously, the bolts or recesses can be disposed on the same side.

The two halves of the nut 3 are made of a plastics material, e.g. Teflon. The bolts 12 consist of metal and are inserted in the halves subsequently. Obviously, the locating elements could also be cast integrally with the cut faces 11.

The two joined halves 10 and 10' of the nut 3 are held together by a clamping device 8 in the form of a U-shaped metal collar. The two flanges of the U in this case rest on parallel external sides 15 and 15' of the nut. A shackle 6 is pivotably mounted on the nut 3 by its free ends 9 and 9'. The shackle is then pivotable about an axis 7 disposed transverse to and at a distance from the central axis. The shackle is elastically formed, in such a manner that its free ends 9, 9' can be stretched apart and engaged in bores on the parallel sides 15, 15'. The shackle ends in this case engage through the clamping device 8 so that the said clamping device is held on the outside of the nut in an unlosable manner. The nut has a lower end face 16 and an upper end face 17 at a distance from the inner thread 14, the said end faces pushing off wedged conical joints by rotation of the nut. The shackle 6 is substantially provided with flanges bent back at right angles. Obviously, the shackle could also have another configuration. In certain cases, it would be conceivable and advantageous if the part of the shackle engaging behind the swelling on the conical sleeve is semi-circular.

Figure 6:
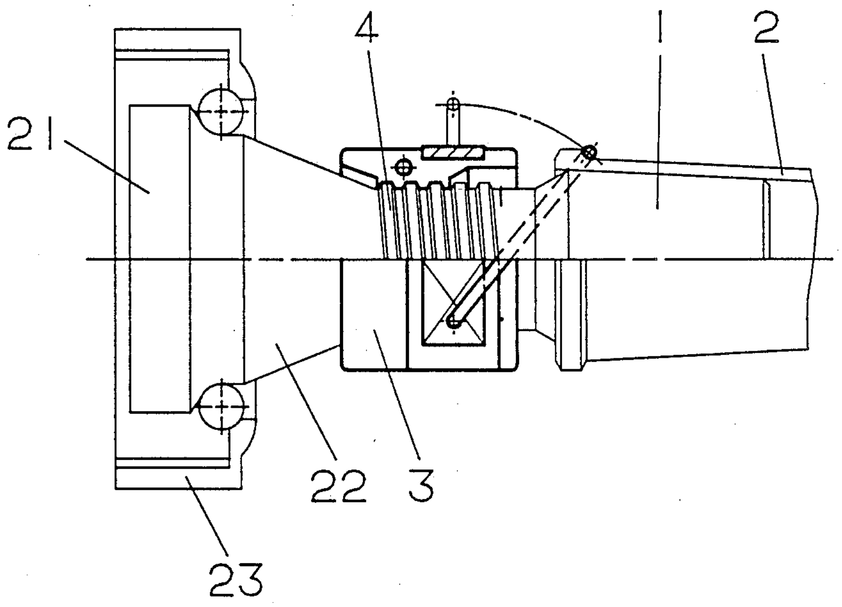
FIG. 6 the same nut on a transition member of another laboratory apparatus.

The practical use of the device according to the invention is illustrated in FIGS. 5 and 6. FIG. 5 shows its use on a steam duct 18 of a rotary evaporator. The steam duct has a conical pin 1, to whose cone an external thread 4 is connected. A conical sleeve 2 with a continous swelling 5 forms the opening of a glass plunger 19 which is not shown in more detail. On the opposite side, a second cone 20 is disposed on the steam duct 18, the conical incline of the said second cone being opposite. The steam duct is inserted into the rotary evaporator on the second cone 20.

The largest outer diameters of the two cones are larger than the outer diameter of the external thread 4. The nut 3 can therefore only be placed on the outer thread 4 by opening the two halves. To hold the conical sleeve 2, the shackle 6 is pivoted behind the swelling 5 and the nut is rotated in the direction of the arrow D. The eccentric hinging and diagonal engaging position of the shackle 6 ensures that the shackle cannot flip over the swelling 5 during tightening. The conical sleeve 2 is, on the contrary, pressed against the conical pin 1 and held fast. The advantage of the pivotable shackle is, inter alia, that the swelling 5 and the conical sleeve 2 may have different configurations. Within certain tolerances, the shackle fits the external configurations.

In order to release the joint, the nut is rotated back in the direction of the arrow C, in which case a half-turn is usually completely sufficient. The shackle 6 can then, as indicated, be pivoted upwards and the plunger 19 can be removed. This is obviously possible with minimal gripping and without the necessity to unscrew the nut completely from the thread. If the conical joint becomes stuck and the plunger 19 cannot be removed immediately, the nut 3 is rotated again in the direction of the arrow C until the lower end face 16 of the nut abuts the swelling 5, and the conical sleeve 2 can in this way be pushed back. The nut 3 is so formed that the joint on the second cone 20 can also be pushed back by screwing the nut into the left-hand position in the direction of the arrow D. The device according to the invention thus not only holds the conical joint together in an advantageous manner, but can also be used to push back the conical sleeve on one or both sides.

FIG. 6 illustrates an alternative use of the same nut 3. The conical pin 1 and the conical sleeve 2 are the same as in the example according to FIG. 5. Instead of the steam conduit, however, there is a transition member 21 with a funnel-shaped widening 22. This widening opens into laboratory apparatus 23 which is not shown in more detail. The outer thread 4 on the transition member 21 is somewhat shorter than in the case of the steam conduit, as the pushing away function of the nut 3 only has to be carried out on one side.

The conical pin 1 does not necessarily have to be formed as a hollow body. The device according to the invention could equally well be used without modification on an inspection plug provided with an external thread for receiving the nut.

I claim:

1. A device for holding together and releasing conical joints, in particular on laboratory apparatus, comprising a conical pin (1) and conical sleeve (2) having a common central axis and a nut (3), which engages in an outer thread (4) on the conical pin (1), and a tension device disposed on the nut and engaging behind a continuous swelling (5) on the conical sleeve (2), the conical sleeve being pressable against the conical pin by said swelling when the nut is rotated, wherein the tension device is a shackle (6), said shackle being pivotably mounted on the nut (3) about an axis (7) transverse to and at a distance from the central axis, and wherein the nut (3) is divided into two halves in a plane approximately parallel to the central axis and is surrounded on its exterior by a detachable clamping device (8), which holds the two halves together on the outer thread.

2. A device according to claim 1, wherein the shackle (6) is hinged on the clamping device (8) and has free ends (9, 9') which engage in the nut (3) through the clamping device, the shackle being elastically formed in such a manner that the two ends may be stretched apart in order to engage.

3. A device according to claim 2, wherein the clamping device (8) is a U-shaped collar.

4. A device according to claim 2, wherein at least one locating element (12) is disposed on cut edges (11) of one of the halves, said locating element engaging with positive locking in a recess (13) on an adjacent cut edge of the other half.

5. A device according to claim 2, wherein the nut is formed in one piece and has a hinge-like joint for opening in the longitudinal direction between two halves which open like a hinge.

6. A device according to claim 2, wherein the nut is manufactured from plastics material.

7. A device according to claim 6, wherein the shackle and the clamping device are manufactured from metal.

* * * * *